Sept. 4, 1945.  A. STIEGLITZ  2,384,353

POWER REGULATION FOR AIRCRAFT ENGINES

Filed June 4, 1938

TO SUPERCHARGER SPEED REGULATOR

Inventor
Albert Stieglitz
by Knight Bros
attorney

Patented Sept. 4, 1945

2,384,353

UNITED STATES PATENT OFFICE 2,384,353

POWER REGULATION FOR AIRCRAFT ENGINES

Albert Stieglitz, Berlin-Spandau, Germany; vested in the Alien Property Custodian Application June 4, 1938, Serial No. 211,843
In Germany June 4, 1937

1 Claim. (Cl. 170—135.6)

The present invention relates to power regulation for supercharged internal combustion engines for aircraft, in which is used a variable-pitch air propeller which by means of a regulator keeps any adjusted predetermined speed constant. In known power regulators, the effect of air density variations, due to variations in altitude, on the charging pressure of the engine is counteracted by means of a barometric Sylphon bellows which is subjected to the atmospheric air, i. e., the intake pressure of the supercharger, and serves to adjust the throttle valve of the supercharger. The proper relation between the operation of the bellows and the position of the throttle must be experimentally determined and fixed in a control curve according to which the mechanism connecting the bellows and the throttle operates. This curve applies to one given output power, so that in order to adjust the regulation to different power conditions, several control curves or a manual adjustment must be provided for, the former leading to complicated constructions, the latter being exacting on the attention of the pilot. In another known type of power regulators the impulse for controlling the supercharger throttle is not derived from the outer atmospheric pressure but from the charging perssure, i. e., the pressure behind the blower and immediately ahead of the engine intake. These regulators also require an adjustment for adapting the charging pressure to the desired output power. The necessary means for varying the datum value of this adjustment are also rather complicated and space consuming. Some of the known power regulators have the further disadvantage that a defect or breakdown of the automatic regulating means renders the engine completely uncontrollable.

According to the invention these drawbacks are avoided by keeping, by means of a regulator actuating the throttle valve, the pressure or the density of the charge behind the throttle valve and ahead of the blower constant at a definitely adjusted predetermined value up to full power output. This pressure corresponds to the external air pressure for a full power output. A certain charging pressure will then adjust itself for each speed, remaining almost the same with varying altitude. Hence, the regulation according to the invention is based on the fact that there is a predetermined relation between the engine speed and the pressure of the charge. Due to this relation, the value of the full power output remains about the same for all charging pressures and approximately equal to the rated power output.

The construction, operation and advantage of power regulators according to the invention will be understood from the following description of the embodiments shown in the drawing, in which—

Figure 1:
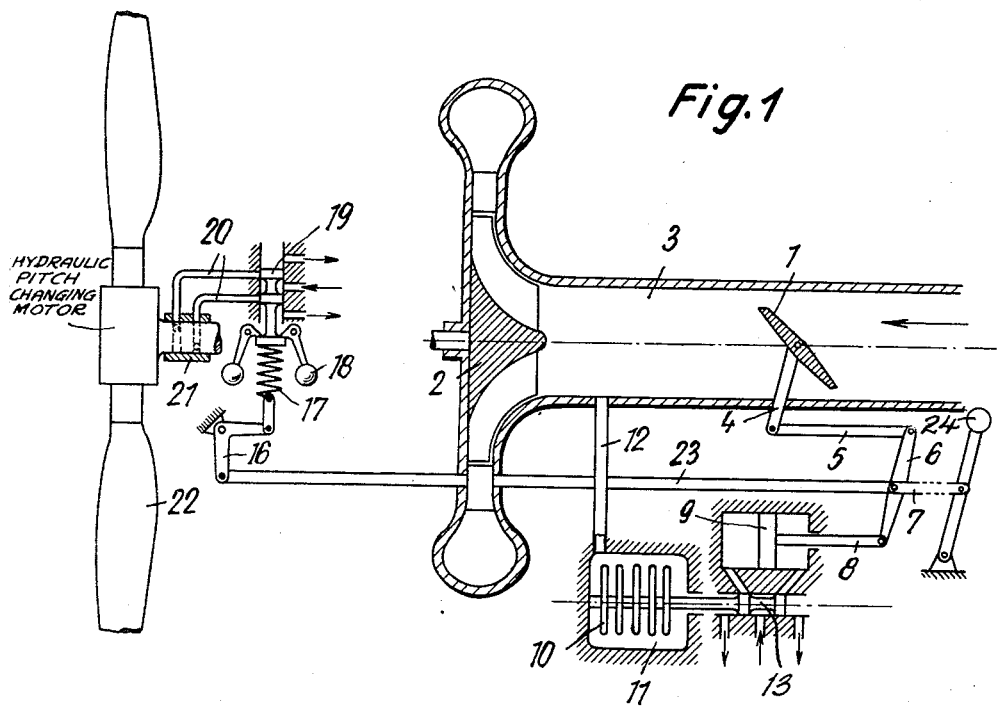
Figure 1 shows more or less diagrammatically, and partly in longitudinal section, the regulator in connection with a one-stage blower.

Referring to Figure 1, throttle 1 controls the air current in the intake pipe 3 of supercharger 2, which latter serves for supplying to the motor air or fuel-air mixture at the pressure necessary at the moment and in the required amounts. Throttle 1 thereby operates so that, in case the aircraft rises to a rarer atmosphere, the pressure and quantity of the air conveyed to the motor are maintained substantially constant by further opening of the valve. Thus the supercharger receives substantially the same amount of air per time unit at the higher altitude as it received before at the lower altitude. The throttle valve 1 is connected by the rod arrangement 4, 5 with one end of the double-armed lever 6, which is connected intermediate its ends with the hand-actuated lever 24 by the rod 7. The other end of lever 6 is connected by the piston rod 8 with the servo-motor piston 9 of the regulator. The impulse transmitter 10 of the regulator consists of a Sylphon bellows capsule arranged in a chamber 11, which is connected by the conduit 12 with the suction pipe 3 between the throttle 1 and supercharger 2 so that the same pressure prevails in chamber 11 as ahead of the supercharger. On a change of pressure in pipe 3, the impulse transmitter 10 shifts the control piston 13 of the servo-motor, by which in known manner the pressure oil supply to the servo-motor piston 9, and in consequence thereof the operating motion of said piston, is controlled. In case the pressure in the suction pipe ahead of the supercharger differs from the predetermined value, the throttle valve continues being adjusted by the regulator by way of the servo-motor piston and the aforedescribed rod arrangement, until the predetermined value has been attained.

The speed regulator of the variable-pitch air propeller 22 is connected to the common hand control lever 24 through the rod 23 and the bell crank lever 16. The fluid control piston 19 held in equilibrium by the centrifugal weights 18 and the spring 17 controls through the conduits 20 in a well-known manner, for instance as shown in the U. S. patent to Shoemaker, No. 2,086,097, the pressure oil supply to the variable pitch propeller 22 thus influencing its pitch. The predetermined speed adjusted by the hand lever 24 through adjusting the tension of the spring 17 is held constant by the speed regulator.

If the hand lever 24 is shifted (to the right in Figure 1) so as to attain a higher power output, the speed regulator 18 is also adjusted for a higher predetermined speed and, besides, the throttle valve 1 is opened further. However, the proper position of the throttle valve, in which for the higher speed the same pressure ahead of the charger is attained, is only adjusted by the pressure regulator 10.

Figure 2:
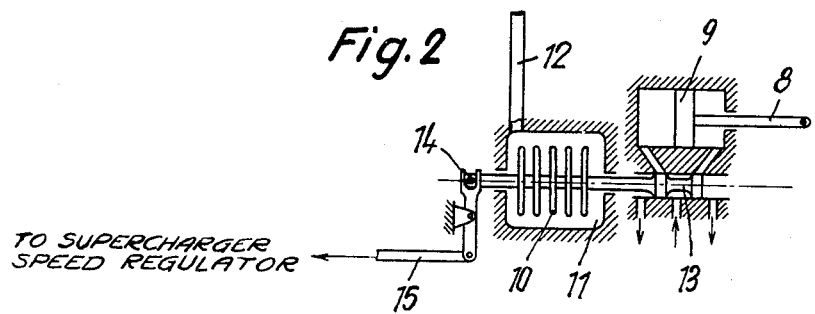
Figure 2 shows in longitudinal section a construction of the regulator in case a multistage blower is employed.

When using a two-speed super-charger, the predetermined value of the regulator must be altered when changing the charger speed, corresponding to the two different full power output values for the two charger speed ranges. This is effected in the example shown in Figure 2 by shifting bodily the bellows capsule by means of the lever 14 and rod 15, connected with the supercharger speed changer, which is actuated by hand or automatically (not shown). By these means the operating range of the control valve 13 is shifted. Changing the predetermined value may also be effected in any other known manner, for instance, by a slide on the control piston or by a throttle valve in the throttle chamber of the regulator. In the case of a continuously or steplessly regulatable charger gear, the predetermined value must always be changed with the rotation speed of the charger.

As apparent from the above-described embodiments, the power regulation according to the present invention is based on a predetermined relation between the engine speed and the pressure of the charge. Since the pressure immediately ahead of the blower controls the adjustment of the throttle valve, the charging conditions of the engine remain constant regardless of changes in the output power. If the output power is to be kept constant, the only requirement is to maintain the motor speed constant, and this is taken care of by the speed governor. If, on the other hand, the output power is to be changed, the only adjustment needed is a variation of the speed by adjusting the pitch of the propeller. As in both cases, the charging pressure is automatically kept constant; no adjustment or other manual adaptation of the pressure-responsive control means to the changed power conditions is necessary as contrasted to the known power regulators aforementioned. As a result, a considerable simplification in construction and an increased reliability of operation are obtained.

In power regulators according to the invention, maintaining a constant pressure ahead of the charger results in a slight increase of the charging pressure with increasing altitude owing to a decrease in temperature. If instead of the pressure the density of the air is regulated ahead of the charger, a slight decrease of the charging pressure will be obtained with decreasing altitude. If now the Sylphon bellows capsule, which for measuring the pressure is evacuated and for measuring the density is completely filled with air, should only be partially filled with air, the course of the charging pressure and consequently the course of the power output may be varied with varying altitude within certain limits as desired.

I claim:

In a power regulator for internal combustion motors for aircraft having a supercharger and a variable-pitch air screw, the combination of a servo-motor for varying the pitch of said air screw; a speed-responsive governor provided with a spring, for controlling said servo-motor, so as to maintain the speed of said air screw at a datum value determined by the setting of said spring; an intake tube for the supercharger; a throttle in said tube provided with operating links, for controlling the air supply to the supercharger; pressure responsive control means connected to a point in said tube between said throttle and the supercharger; a second servo-motor controlled by said control means, and having an operating rod; a linkage between said second servo-motor and said throttle having a double lever pivoted to the operating rod, at one of its ends, and pivoted to said links connected to the throttle, at its other end; a manually-operated lever; a link pivoted on said manually-operated lever, at one of its ends, and pivoted, at its other end, on said double lever, at the middle of said double lever; a second linkage between said governor and said manually-operated lever, for changing the setting of said spring, and having a link pivoted to the middle of the double lever on the pivot of the double lever and the link from the manually-operated lever; the relation of the parts being such that the throttle and the spring are subject to simultaneous adjustment by the manually-operated lever, and the throttle is subject to adjustment by the second servo-motor without affecting the pitch control.

ALBERT STIEGLITZ.